US006834599B1

(12) United States Patent
Fuessel et al.

(10) Patent No.: US 6,834,599 B1
(45) Date of Patent: Dec. 28, 2004

(54) PRODUCT DIVERTER VALVE AND COLLECTOR APPARATUS FOR AIR DRILL SEEDING SYSTEM

(75) Inventors: Jason M. Fuessel, Yorkton (CA); Kevin A. Anderson, Atwater (CA); Cory W. K. Ochitwa, Yorkton (CA); Barry B. Barsi, Yorkton (CA); Lawrence S. Grodecki, Yorkton (CA)

(73) Assignee: Morris Industries Ltd., Saskatchewan (CA)

( * ) Notice: Subject to any disclaimer, the term of this patent is extended or adjusted under 35 U.S.C. 154(b) by 0 days.

(21) Appl. No.: 10/458,467

(22) Filed: Jun. 10, 2003

(51) Int. Cl.[7] ................................................. A01C 7/20
(52) U.S. Cl. ...................................... 111/175; 111/186
(58) Field of Search .................... 111/170, 77, 174–188; 221/211

(56) References Cited

U.S. PATENT DOCUMENTS

| | | | |
|---|---|---|---|
| 4,779,765 A | 10/1988 | Neumeyer | |
| 5,980,163 A | 11/1999 | Gregor et al. | |

FOREIGN PATENT DOCUMENTS

| | | | |
|---|---|---|---|
| AU | 717761 | 3/2000 | |
| CA | 2242044 | 12/2002 | |

OTHER PUBLICATIONS

Maxim II Air Drill System Brochure (Morris)—Front Cover, pp. 19 and 20, Back Cover, Date Unknown.

*Primary Examiner*—Christopher J. Novosad
(74) *Attorney, Agent, or Firm*—Hovey Williams LLP

(57) ABSTRACT

An improved collector assembly comprises a generally hollow body mounted below a product supply tank for receiving plural streams of materials metered from the tank. Individual upright passages through the body corresponding in number to the metered streams from the tank receive the gravitating product streams and direct each stream into either or both of an upper loading zone and a lower loading zone in the passage. A diverter valve associated with each upper loading zone can be set to close off the upper loading zone entirely while opening only the lower zone or closing off the lower loading zone while opening only the upper loading zone. Thus, air streams passing transversely through the upper and lower loading zones respectively can be supplied with variable amounts of metered product, depending upon the position of the diverter valve within each passage. By providing multiple supply tanks and multiple collector assemblies, various product delivery scenarios can be achieved including single shoot, double shoot and triple shoot effects. In a preferred form of the invention all diverter valves are actuated by a common actuating mechanism for simultaneous adjustment.

8 Claims, 9 Drawing Sheets

PRODUCT DIVERTER VALVE AND COLLECTOR APPARATUS FOR AIR DRILL SEEDING SYSTEM

TECHNICAL FIELD

The present invention relates to agricultural pneumatic seeding equipment and, more particularly, to apparatus for distributing materials such as seeds and fertilizers from a number of separate bulk supply tanks into pneumatic conveying lines that deliver the materials to a multitude of remotely located ground-engaging openers that deposit the seed and/or other materials into the ground as the machine is advanced. More especially, the present invention is directed to an improved collector assembly beneath each product supply tank wherein products from the different tanks are easily combined into one primary stream or delivered separately to their points of delivery.

BACKGROUND AND SUMMARY

It is known in the art of air seeding to provide large, high-capacity carts that are towed by a tractor along with an implement having a multitude of ground engaging openers that deposit seeds and/or fertilizers into the soil from separate bulk supply tanks on the cart. Collector assemblies have been used below the tanks to introduce streams of materials gravitating from the tanks into pneumatic conveying lines that deliver the materials to their ultimate destinations. Such collector assemblies have heretofore comprised a generally hollow body or manifold type structure that is subdivided into a generally horizontally extending series of compartments through which individual air streams pass to define loading zones in the compartments. Metered materials from the overhead tank drop into the air streams at the loading zones and are transported thereby to the openers.

It is also known in the art to utilize diverter valves in association with the pneumatic conveying streams to selectively divert materials from one tank into the streams of materials from another tank. In the case of seeds in one tank and fertilizer in another, combining the streams in this manner is known in the art as a "single shoot" operation. When the materials are delivered in separate conveying lines and delivered to different points on the ground-engaging opener, this is typically referred to as a "double shoot" operation.

The present invention is directed to an improved collector assembly below each tank that provides significantly enhanced double shoot or single shoot operations, among other distinct advantages. In one preferred form of the invention, the improved collector assembly comprises a generally hollow body having a number of horizontally spaced, vertical passages therein that receive materials from metering mechanism associated with an overhead supply tank. The upright passages are segregated from one another by upright partitions in the body, and each passage has an upper loading zone that is intersected by a conveying air stream passing transversely through the passage. In addition, each passage has a lower loading zone that is intersected by a lower conveying air stream passing transversely through the passage. A diverter valve located just above the upper loading zone can be positioned in a number of alternative positions within the gravitational path of travel of materials in the passage so as to control the amount of materials that are directed into the upper loading zone verses the lower zone.

In one position of the diverter valve the upper loading zone can be completely closed so that the entire volume of materials moving through the passage gravitates to the lower loading zone to combine with materials from another tank that have already been introduced into the lower air stream. This provides a single shoot operation. At another extreme, the diverter valve can completely close the lower loading zone so that all materials from the overhead tank gravitate into the upper air stream, hence preparing the machine for double shoot operation. This arrangement provides a high degree of flexibility for the farmer as different tanks of the machine can be used at different times for different materials, and different pneumatic conveying lines can similarly be used at different times to convey different materials.

In one particularly preferred form of the invention, all of the diverter valves of a collector assembly are linked together by a common actuating rod so that they can all be shifted between their various adjusted positions simultaneously. Again, this greatly facilitates set up by the farmer and provides a way of obtaining uniform settings on all of the valves. Preferably, each collector assembly is comprised of a pair of separate collector modules that are stacked one on top of another to provide the desired passages through the assembly Additional modules may be provided to achieve additional flexibility such as for triple shoot operations, although each collector assembly may alternatively comprise a single composite body within which the necessary passages and valves are located.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
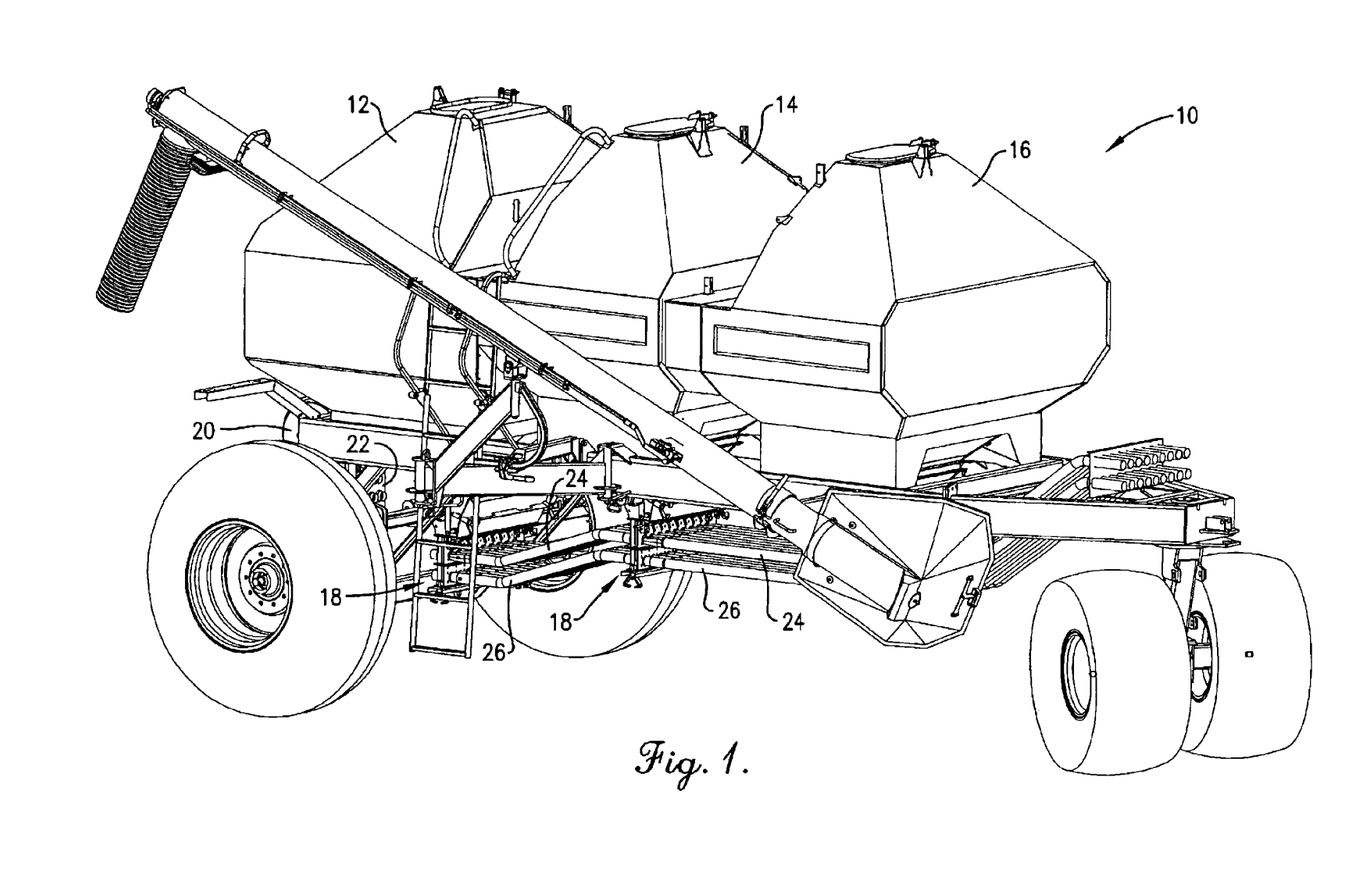
FIG. 1 is a right front isometric view of a bulk seed supply and air distribution cart incorporating the principles of the present invention.

The machine illustrated in FIG. 1 comprises an air cart 10 that is adapted to be connected in tandem with a towing tractor (not shown) and a planting implement having multiple openers thereon (not shown). Generally speaking cart 10 supplies seeds and/or fertilizer to the planting implement as the tractor pulls both machines in tandem across a field.

The particular air cart 10 selected for purposes of illustration has three tanks 12, 14 and 16 included as a part thereof, although this number may vary. The tanks 12–16 may be used, for example, to separately contain seeds, starter fertilizer and additional fertilizer or granular inoculant for the soil.

Each of the tanks is provided with its own collector assembly 18 at the bottom of the tank for introducing materials from the tank into a number of conveying air streams. Such air streams are produced by a fan 20 at the rear of the cart that delivers air to a distribution manifold 22. Manifold 22, in turn, directs the powerful air streams into upper and lower primary runs of conveying lines 24 and 26 respectively, in the present example there being a total of nine upper primary lines 24 and nine lower primary lines 26. Although FIG. 1 illustrates lines 24 and 26 disconnected from the manifold 22, it will be appreciated that, in practice, a section of pipe or hosing extends between such locations to complete each conveying line. From the front of the air cart 10, conveying lines 24 and 26 are coupled with flexible hoses (not shown) that lead to the planting implement where appropriate divider structure splits each primary stream into a number of secondary product streams leading to individual openers of the implement.

Figure 2:
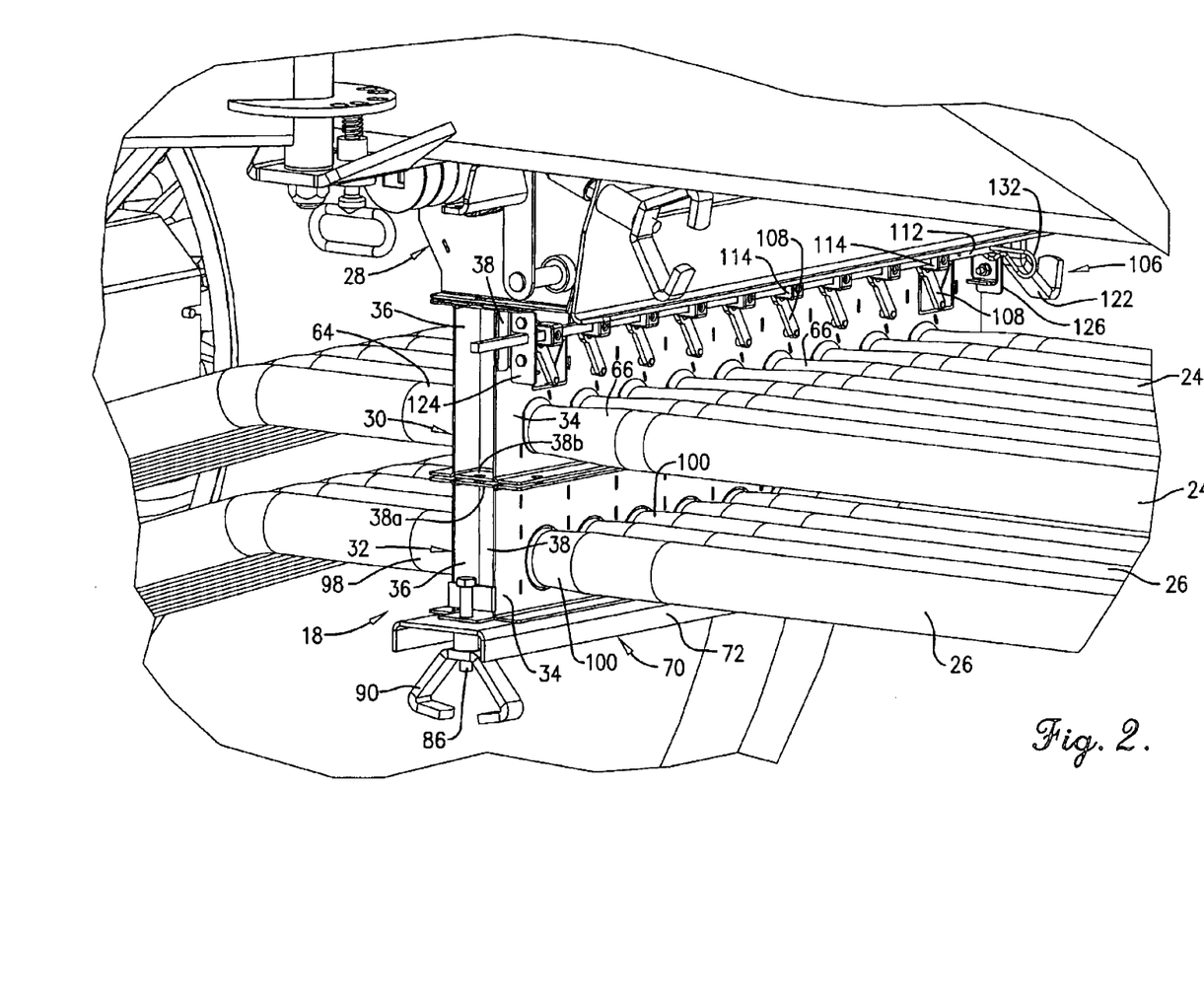
FIG. 2 is an enlarged, fragmentary view thereof illustrating one of the collector assemblies below a supply tank of the cart.

FIG. 2 illustrates the collector assembly 18 that is disposed below the central tank 14 on the machine. As illustrated in that figure, a metering unit 28 containing suitable metering mechanisms such as a plurality of fluted rollers (not shown) is disposed at the bottom of the tank for discharging materials at a metered rate of flow into the collector assembly 18. Collector assembly 18 thus effectively receives materials gravitating from the overhead tank through an outlet thereof. Preferably, although not necessarily, the metering mechanism within unit 28 is such that while the materials gravitating from the overhead tank normally flow into a region occupied by the fluted rollers, such rollers can be intentionally bypassed if and when the operator wishes to completely and rapidly empty the contents from the tank so that they pass directly into collector assembly 18 instead of being metered slowly by the metering rolls. As will subsequently be explained, the present design of collector assembly 18 is particularly conducive to rapid, complete and easy dumping of the contents of the overhead container.

Each collector assembly 18 comprises a generally hollow body that includes a pair of vertically stacked collector modules 30 and 32. The body of each module 30,32 is generally rectangular and is fabricated from a plurality of plate materials to present a front wall 34, a spaced rear wall 36, and a pair of opposite end walls 38 and 40. Front wall 34 is provided with out-turned flanges 34a and 34b; rear wall 36 is provided with out-turned flanges 36a and 36b; end wall 38 is provided with out-turned flanges 38a and 38b; and end wall 40 is provided with out-turned flanges 40a and 40b, all of which flanges facilitate bolting of collector modules 30, 32 to one another and to the bottom of metering unit 28.

As illustrated in particular in FIGS. 5–8, the interior of upper collector module 30 is subdivided by a plurality of upright, transversely spaced partitions 42 extending between front wall 34 and rear wall 36, there being a total of eight such partitions. Partitions 42 cooperate with one another and with opposite end walls 38, 40 to present nine separate upper compartments 44 across the width of the module 30 which arc effectively sealed from one another. Upper compartments 44 directly underlie corresponding outlets of the metering unit 28 so as to receive nine corresponding, discharging streams of material from such unit.

Lower module 32 has a similar series of eight upright partitions 46 that extend between front and rear walls 34, 36 thereof and cooperate with end walls 38, 40 to define nine discrete compartments 48 in lower module 32. The nine upper compartments 44 are in direct overhead registration with the corresponding nine lower compartments 48 so as to effectively define nine generally upright passages 50 extending from the upper margin of upper module 30 to the lower margin of lower module 32, each such passage 50 having an upper portion defined by the corresponding upper compartment 44 and a lower portion defined by the corresponding lower compartment 48.

Each upper compartment 44 is provided with an upper loading zone 52 formed by a transversely J-shaped cup 54 extending between front wall 34 and rear wall 36 thereof. The generally upright leg 56 of cup 54 is located approximately halfway between adjacent partitions 42 and terminates at a distance below the top margin of upper module 30. The concave leg 58 of each cup 54 likewise extends the entire distance between front wall 34 and rear wall 36 and has its distal end welded or otherwise secured to the proximal partition 42 or end wall 38 as the case may be. Concave leg 58 of each loading cup 54 registers with an inlet 60 in rear wall 36 and an outlet 62 in front wall 34. As shown in FIG. 2, and also certain of the other figures, a rear tube 64 comprising part of the upper conveying line 24 is secured to back wall 36 in registration with inlet 60, while a front tube 66 is secured to front wall 34 in registered communication outlet 62. Thus, each upper loading zone 52 is disposed within the path of pressurized air flowing through a corresponding one of the upper primary conveying lines 24.

Each of the upright passages 50 is also provided with a lower loading zone 68 located in the corresponding lower compartment 48. In this respect, a floor 70 extends across the entire width of the body of collector assembly 18, and particularly across the bottom of lower module 32. As illustrated especially in FIGS. 3, 5, 6 and 7, floor 70 includes a transversely U-shaped, inverted channel 72 having three cup segments 74, 76 and 78 bolted to the upper surface thereof, each such segment including three separate cups 80, 82 and 84. The length of the line of cup segments 74, 76 and 78 is such that when floor 70 is fastened to the bottom margin of lower module 32 by bolts 86, 88 and wing nuts 90,92, segments 74–78 slip up into lower compartments 48 while channel 72 abuts the bottom flanges of end walls 38 and 40.

Each lower loading zone 68 is in open communication with a rear inlet 94 in rear wall 36 and a front outlet 96 in front wall 34. A rear tube 98 of the corresponding lower primary line 26 is affixed to rear wall 36 in registered communication with inlet 94, while a front tube 100 of line 26 is affixed to front wall 34 in registered alignment with outlet 96. Each lower loading zone 68 is disposed in the path of travel of the air stream flowing through the corresponding primary line 26 as it passes through lower compartment 48. Such air stream thus passes into, through and out of the lower loading zone 68.

Figure 9:
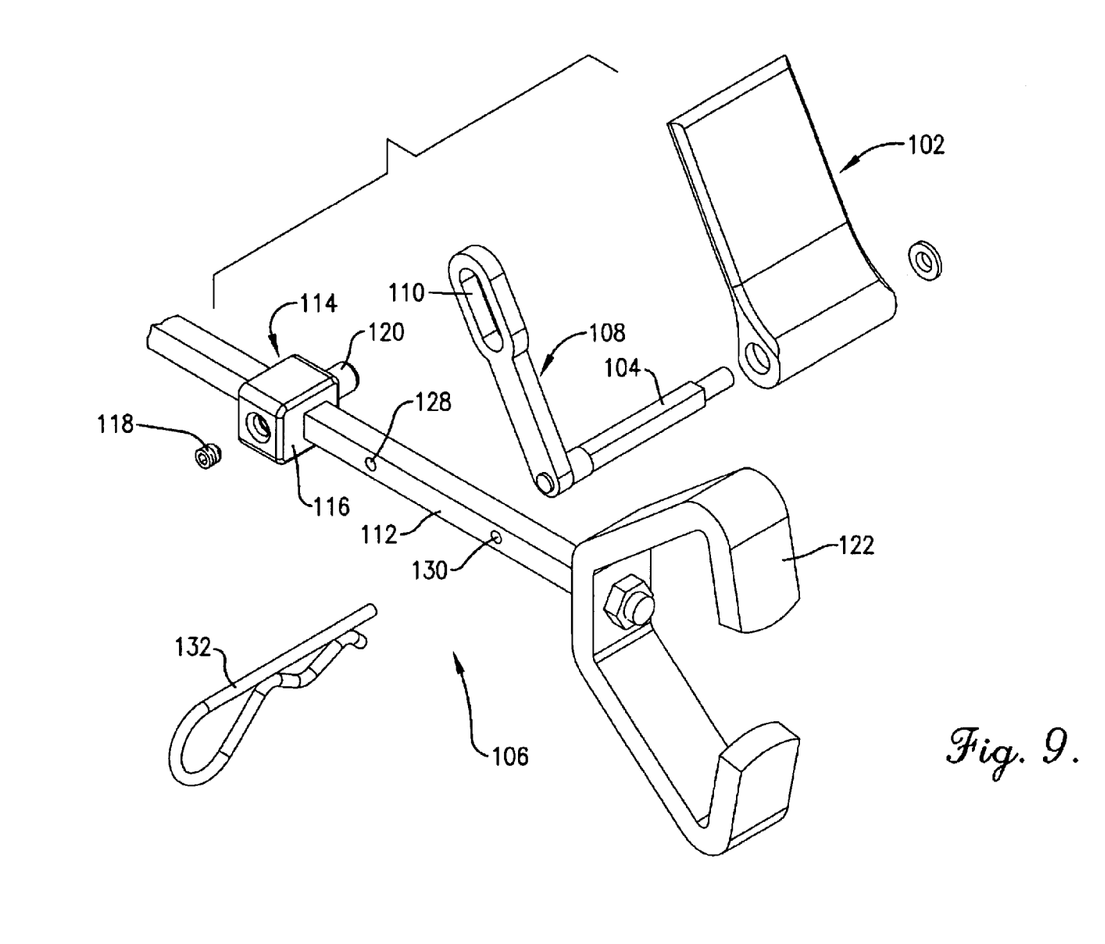
FIG. 9 is an exploded, fragmentary isometric view of the actuating mechanism for the diverter valves.

Each upper compartment 44 of the passages 50 contains its own diverter valve 102. Each diverter valve 102 is in the nature of flapper plate that is substantially the same width in a fore-and-aft direction as the corresponding upper compartment 44. Each valve 102 is fixed to an fore-and-aft rock shaft 104 (detailed in FIG. 9) which is journaled by front and rear walls 34, 36 and is located proximal to the uppermost tip of the J-shaped cup 54 of upper loading zone 52.

Figure 5:
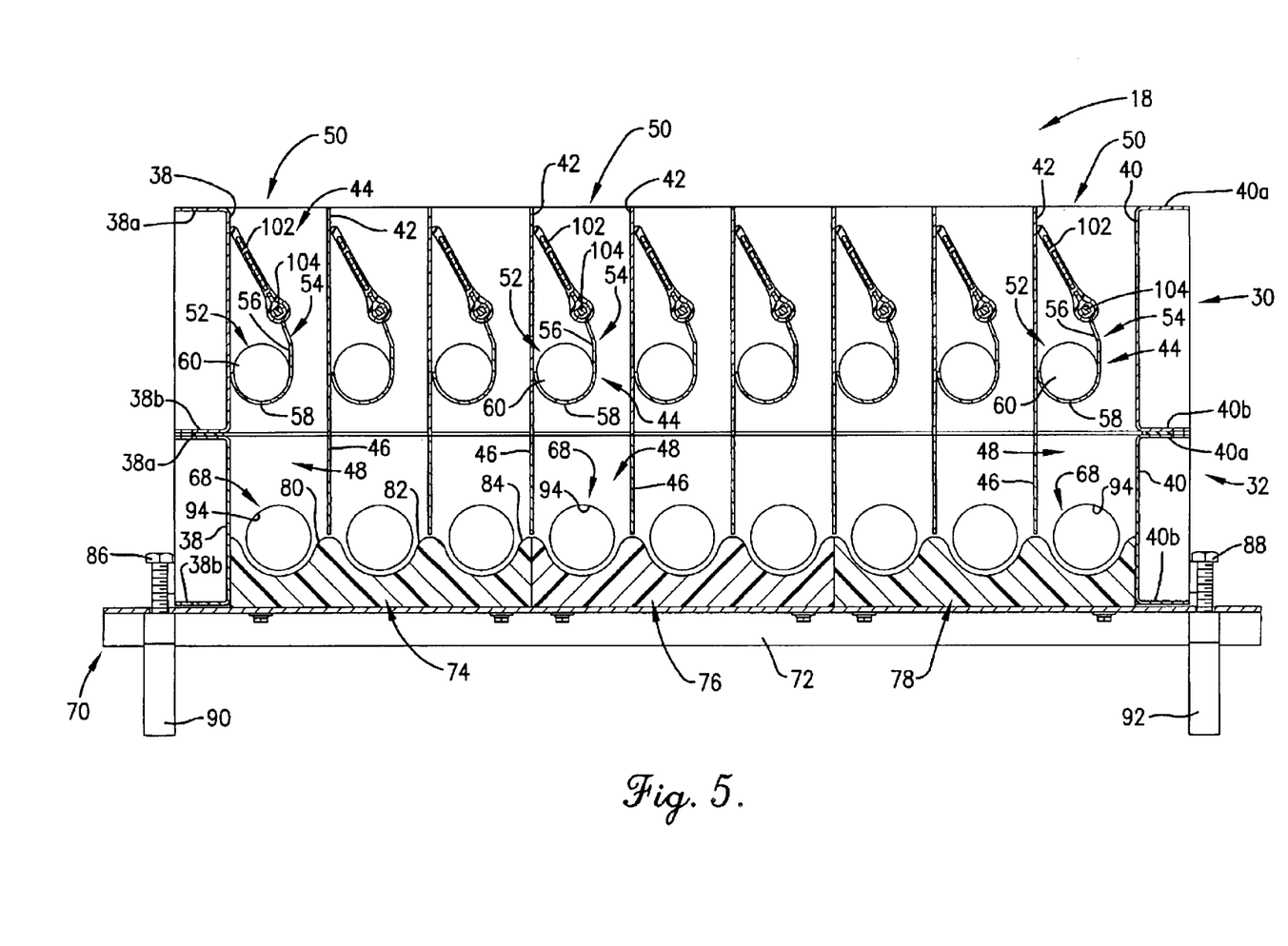
FIG. 5 is a vertical cross sectional view through the collector assembly showing the interior thereof and the diverter valves in the single shoot position of FIG. 4 wherein the valves completely close the upper loading zones and open the lower loading zones.
Figure 6:
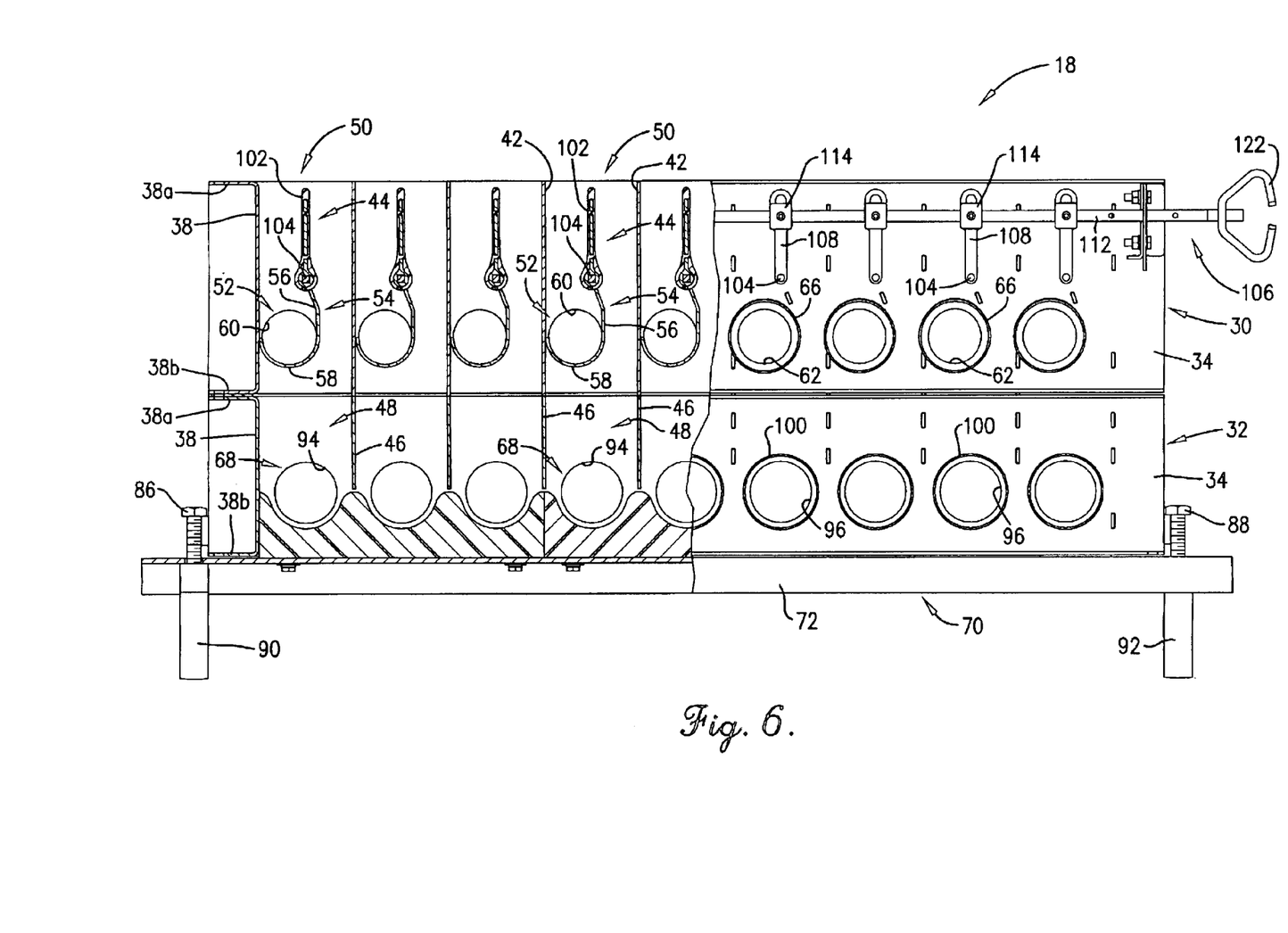
FIG. 6 is a elevational view of the collector assembly with the diverter valves in an intermediate position wherein both upper and lower loading zones are open so that materials from the overhead tank are introduced into both upper and lower air streams passing through the collector assembly, parts being broken away to reveal details of construction.
Figure 7:
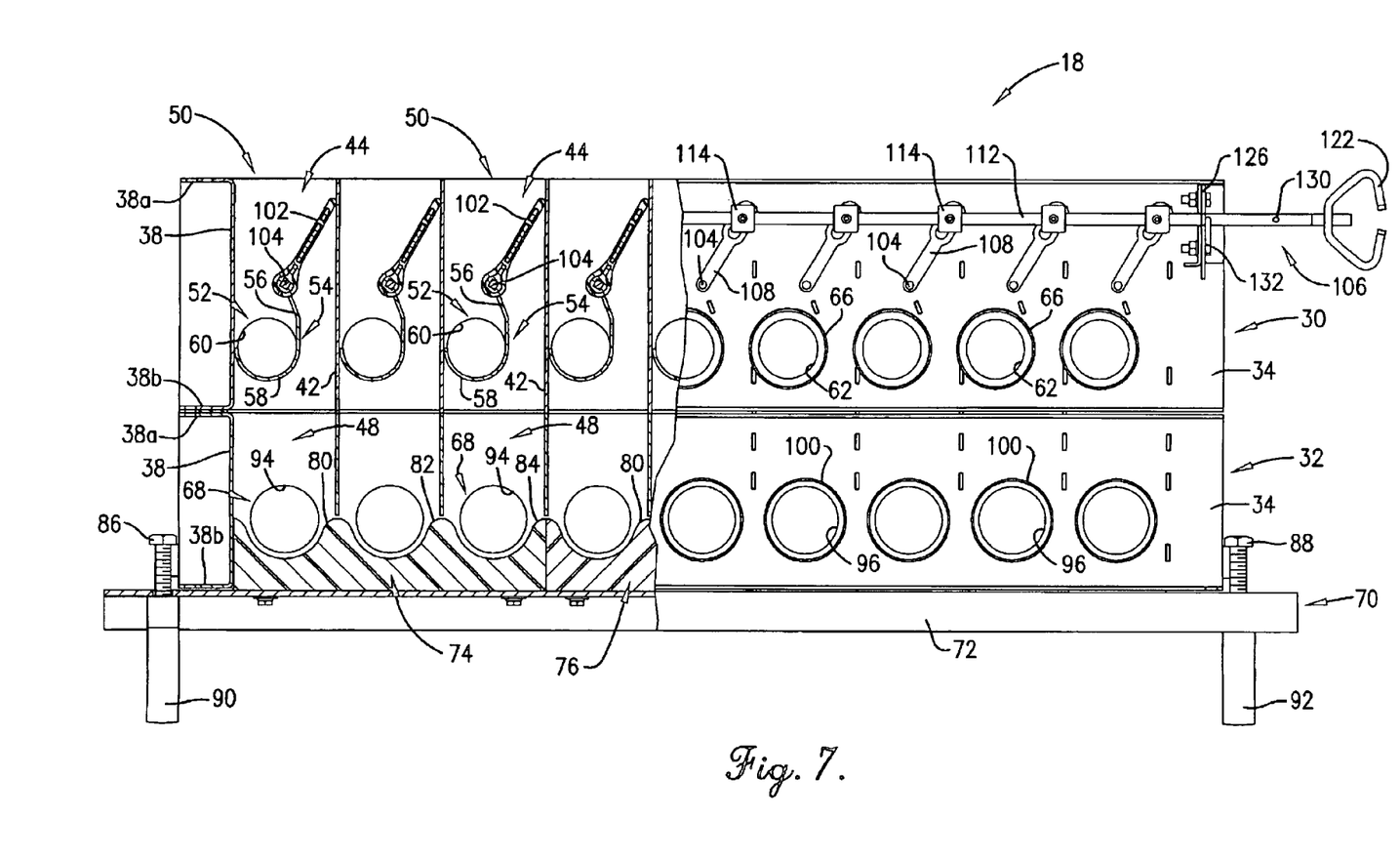
FIG. 7 is an elevational view of the collector assembly similar to FIG. 6 with parts broken away to reveal details of construction and showing the diverter valves in their double shoot position which forces metered products from the overhead container to drop only into the upper loading zones.
Figure 8:
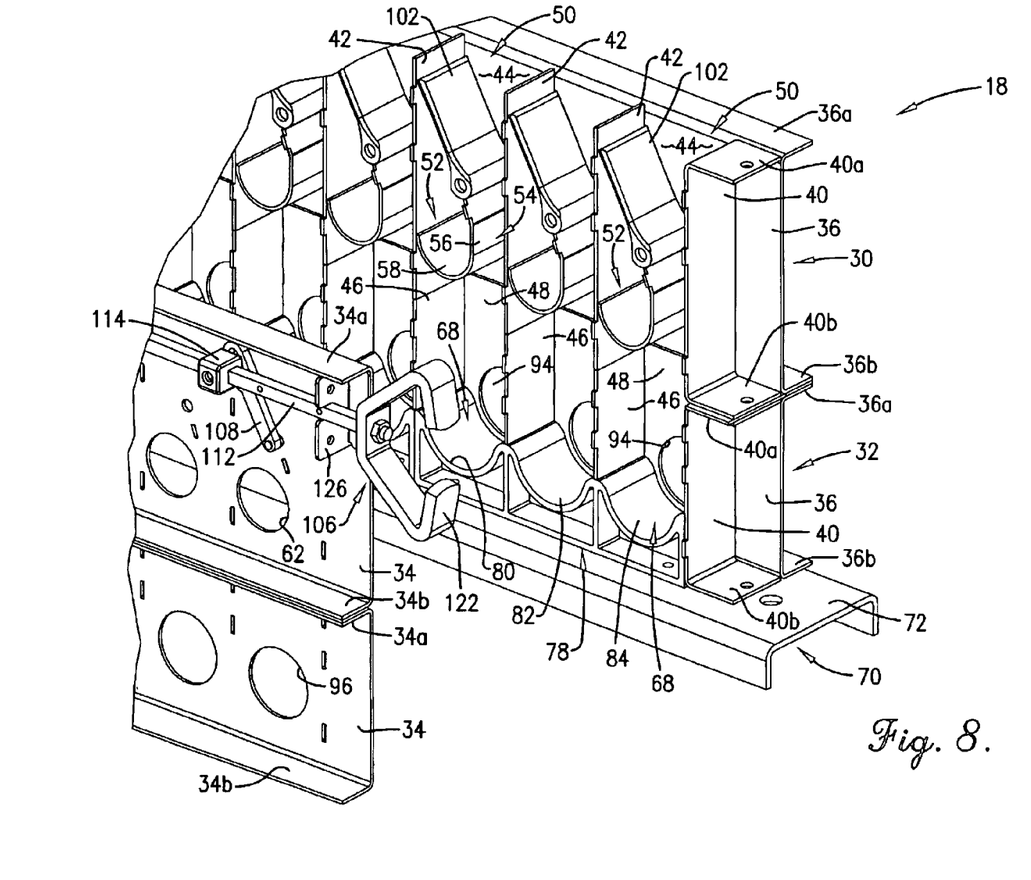
FIG. 8 is a fragmentary, exploded isometric view of the collector assembly with the front wall thereof removed to reveal interior details, the diverter valves being illustrated in their single shoot position.

Each valve 102 is moveable between a position completely covering and thus closing off the upper loading zone 52 as shown in FIG. 5, and an alternative extreme position shown in FIG. 7 in which the valve is inclined in the opposite direction to close off lower loading zone 68. The FIG. 5 position of valve 102 may be referred to as the "single shoot" position wherein only the lower loading zone 68 is open while upper loading zone 52 is completely closed, while the FIG. 7 position of valve 102 may be referred to as the "double shoot" position in which upper loading zone 52 is open but lower loading zone 68 is completely closed. FIG. 6 illustrates the valves 102 in an intermediate position wherein both the upper loading zones 52 and the lower zones 68 are fully open.

In order to actuate the diverter valves 102 between their various positions, actuating mechanism broadly denoted by the numeral 106 is provided. In one preferred form of the invention, actuating mechanism 106 is designed to operate all of the diverter valves 102 simultaneously. More specifically, actuating mechanism 106 includes an operating lever 108 for each valve 102, such lever 108 being affixed to an outer end of rocker shaft 104 where it projects forwardly beyond front wall 34. Each lever 108, in turn, has an elongated slot 110 at its distal end remote from the point of connection of lever 108 to rocker shaft 104.

Mechanism 106 further includes a single push-pull rod 112 that extends across the front of the upper collector module 30 adjacent its upper margin. Further, mechanism 106 includes a series of nine couplings 114 secured to rod 112 at spaced locations along the latter and connecting rod 112 with the nine operating levers 108. As illustrated perhaps best in FIG. 9, each coupling 114 comprises a block 116 that is slidably adjustably positionable along the length of rod 112 and is secured in a selected position by a set screw 118. Further, each coupling 112 includes a pin 120 projecting rearwardly from block 116 into the slot 110 of the corresponding actuating lever 108. Thus, as actuating lever 112 is pushed or pulled along its length, such motion is transmitted to operating levers 108, and the arcuate motion of levers 108 relative to the straight line reciprocal motion of rod 112 is accommodated by virtue of the coupling pins 120 moving between opposite ends of slots 110 in levers 108. A handle 122 at one end of rod 112 facilitates manipulation thereof.

Figure 3:
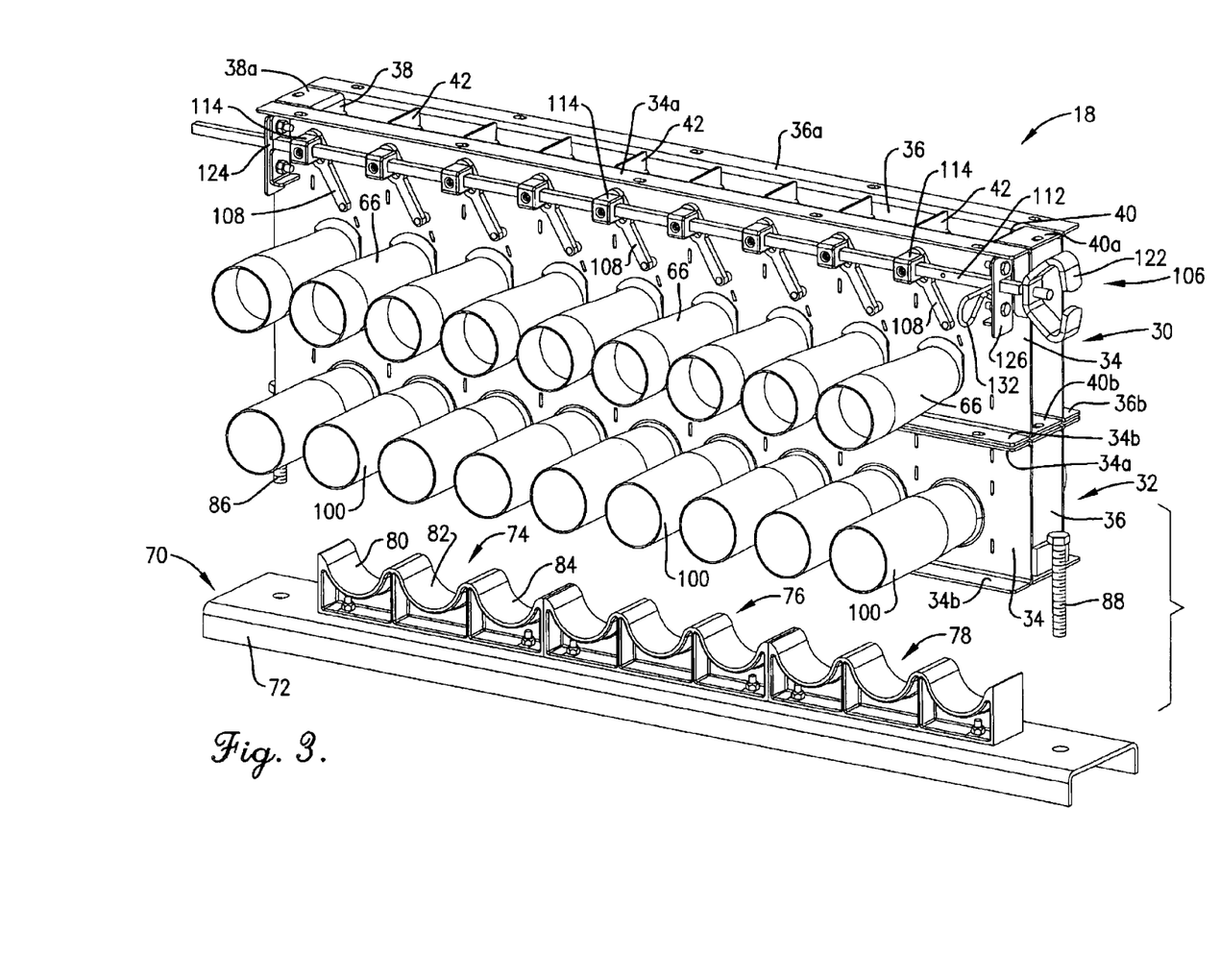
FIG. 3 is an exploded isometric view of the collector assembly illustrating the manner in which the bottom floor thereof may be removed for seed calibration or emptying the contents of the overhead tank.
Figure 4:
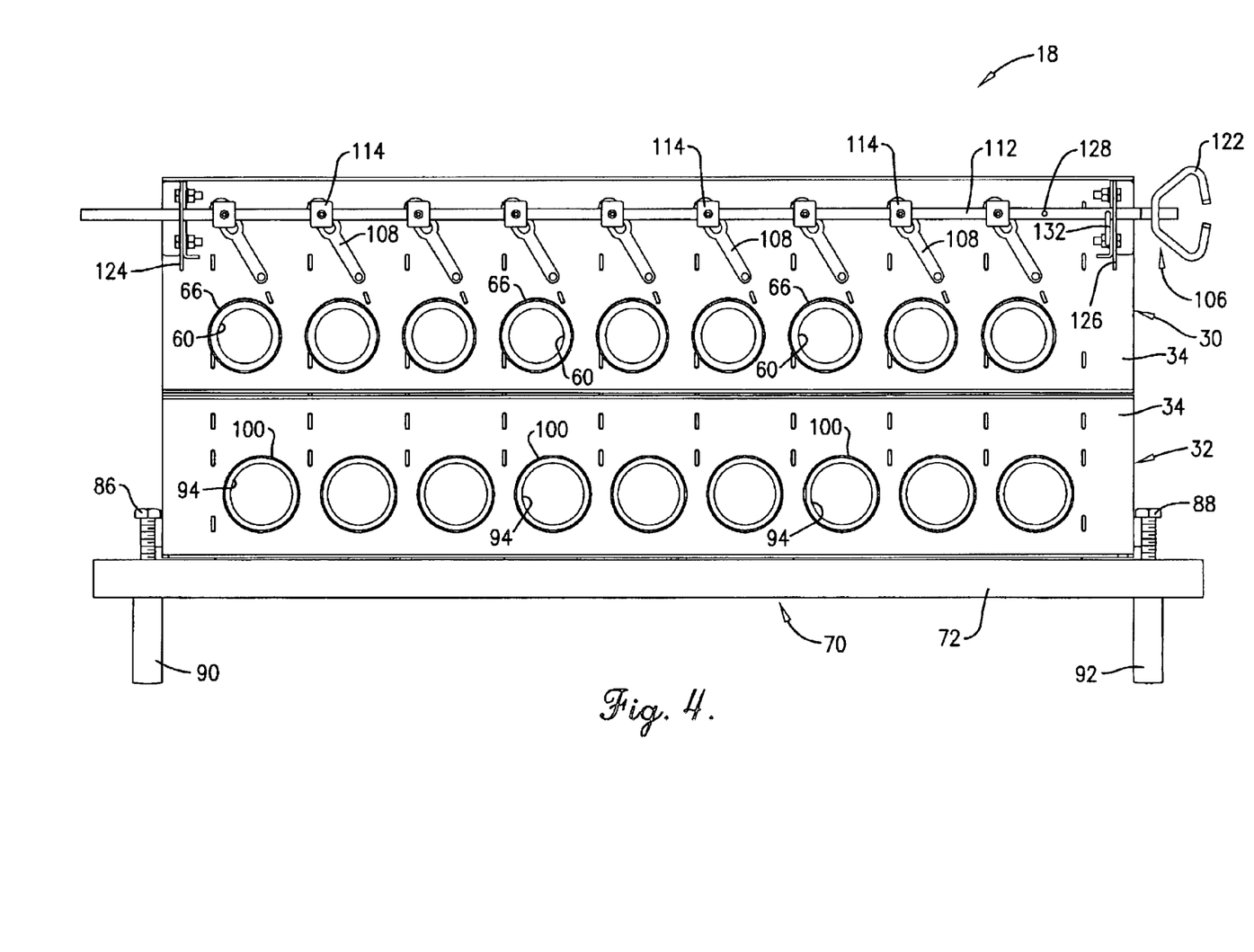
FIG. 4 is an elevational view of the collector assembly in the single shoot mode wherein diverter valves totally close the upper loading zones and open the lower loading zones of the drop passages through the collector assembly.

A pair of guide brackets 124 and 126 are secured to front wall 34 of upper collector module 30 adjacent opposite lateral ends thereof and reciprocably support the push-pull rod 112. Rod 112 has a pair of cross holes 128 and 130 therein generally adjacent handle 122 that are adapted to removeably receive a cotter pin 132. Holes 128, 130 are so located that when rod 112 has diverter valves 102 positioned in the double shoot position of FIG. 5, holes 128 and 130 are both located to the left side of guide bracket 126 as illustrated in FIGS. 3 and 4, for example. Thus, cotter pin 132 may be inserted into hole 130 at such time to bear against the inboard surface of guide bracket 126 and prevent rod 112 from being shifted axially to the right, which would remove diverter valves 102 from their double shoot position. By removing cotter pin 132, rod 112 can be shifted rightwardly from the double shoot position of FIG. 4 until diverter valves 102 are brought to their single shoot positions as illustrated in FIG. 7, for example. Thereupon, cotter pin 132 may be inserted into hole 128 which is now located on the outboard side of guide bracket 126, thus locking rod 112 against leftward movement and thereby retaining diverter valves 102 in the single shoot position.

As illustrated in FIG. 6, when cotter pin 132 is completely removed from rod 112, rod 112 may be positioned in an intermediate position wherein diverter valves 102 open both upper and lower loading zones 52 and 68. Additional holes in rod 112 could be provided to receive cotter pins or the like on opposite sides of guide bracket 126 to hold diverter valves 102 in such intermediate position, if desired. Alternatively, other means could be provided for releasably locking rod 112 and diverter valves 102 in such intermediate position.

Operation

During operation, air streams from lines 24 and 26 are constantly passing through the body of each collector assembly 18. Thus, in the illustrated embodiment, all nine upper loading zones 52 and all nine lower loading zones 68 are always exposed to conveying streams of air. If it is desired for product from the overhead tank to be metered into only the lower primary lines 26, the push-pull rod 112 is set in the FIG. 4 position so as to cause all nine of the diverter valves 102 to close their respective upper loading zones 52 as illustrated in FIG. 5. Thus, product gravitating through passages 50 lands on the diverter valves 102 and is directed away from upper loading zones 52 into lower compartment 48 and lower loading zones 68. Upon entering the lower loading zones 68, the product is immediately entrained in the air streams passing through loading zones 68 and conveyed downstream through lower primary lines 26.

If the air streams coming into lower loading zones 68 have already been loaded with materials from an upstream tank, the products gravitating through the collector assembly simply join with the existing materials and travel together through lower primary lines 26 to their ultimate destinations. Combining products from two different tanks in this manner into lower primary lines 26 provides a single shoot operation.

On the other hand, if the operator desires to have products from the overhead tank enter only into the upper primary lines 24, the push-pull rod 112 is positioned as shown in FIG. 7 to cause all nine of the diverter valves 102 to close all nine lower loading zones 68 and open all nine upper loading zones 52. Thus, product metered from the tank gravitates into the passages 50 and is directed by the diverter valves 102 directly into upper loading zones 52 where the transversely moving streams of air entrain the materials and carry them downstream in upper lines 24. If product from an upstream tank has already been introduced into lower primary lines 26, such product merely passes through lower loading zones 68 and continues to travel within lower lines 26 without being combined in anyway with the product introduced into upper lines 24 at the upper loading zones 52. This results in a double shoot operation.

If, for any reason, the operator prefers to have product from the overhead tank entering both upper lines 24 and lower lines 26, he positions the push-pull rod 112 in the intermediate position of FIG. 6, wherein diverter valves 102 are positioned to open all nine upper loading zones 52 as well as all nine lower loading zones 68 at the same time. Different degrees of openness of the upper and lower loading zones can also be achieved by positioning control rod 112 at any selected one of a number of positions to correspondingly vary the relative amounts of pro duct to flowing into zones 52 and 68.

It will thus be seen that the collector assembly 18 of the present invention provides a great deal of flexibility and convenience for the farmer. Various combinations of tanks and supply lines can be used to best suit the farmer's particular needs at any given time. For example, the cart 10 shown in FIG. 1 has three tanks 12, 14 and 16, each of which is provided with its own collector assembly 18. In one exemplary use of this construction, rear tank 12 may be filled with fertilizer, center tank 14 may contain seeds, and front tank 16 may contain additional fertilizer or an inoculant. If a double shoot operation is desired, the collector assembly 18 associated with rear tank 12 may be set so that all materials from tank 12 bypass the upper loading zones 52 and drop into lower loading zones 68 for pickup by the lower primary lines 26. The collector assembly 18 of middle tank 14 may be set to close its lower loading zones 68 so that all materials from tank 14 are diverted into only the upper zones 52, where they are picked up by the air streams within upper primary lines 24. Thus, fertilizer from rear tank 12 and seeds from middle tank 14 are maintained separate from one another in a double shoot operation. Meanwhile, the collector assembly for the front tank 16 may be set to drop product into either or both of the primary lines 24 and 26 as may be desired, depending upon the nature of the products within the front tank 16.

In other situations it may be desirable, for example, to use all three tanks for the same product. All three tanks may be filled with seeds, for example. By first cleaning out the tanks completely, tanks that have previously been used for fertilizer may now be used for seeds, and vice versa.

To facilitate such clean out, the floor 70 of each collector assembly may be quickly and easily removed by simply unscrewing the wing nuts 90, 92 and allowing floor 70 to drop out. The diverter valves 102 for that particular assembly are then set in the single shoot position of FIG. 5 (see also FIG. 3 with floor 70 removed), allowing the contents of the overhead tank to drop straight through passages 50, by-passing the upper loading zones 52. Ideally, the metering unit 28 above collector assembly 18 can be adjusted at this time to permit the gravitating product flow to by-pass metering mechanism associated with the unit so as to drop cleanly and quickly through the collector assembly into a suitable receptacle below the machine.

It will also be appreciated that calibration of the metering unit 28 can be easily achieved in a manner similar to cleaning out of the tank. By removing the floor 70 from that particular collector assembly and placing it with a calibrating receptacle, product can be run through the metering mechanism of the metering unit and discharged into the calibrating container for measurement. Desired adjustments of the metering mechanism can then be readily carried out.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a particulate materials distribution machine, the improvement comprising:

at least a pair of bulk materials supply tanks, each having a bottom outlet;

a collector assembly below each tank respectively in position to receive materials discharging from the corresponding tank, said collector assembly for each tank having a plurality of generally upright passages therein, each passage including a pair of vertically spaced loading zones comprising an upper loading zone and a lower loading zone;

an upper pneumatic conveying line coupled with each passage respectively in a manner to direct an upper pressurized air stream into, through, and out of the upper loading zone; and a lower pneumatic conveying line coupled with each passage respectively in a manner to direct a lower pressurized air stream into, through, and out of the lower loading zone, said collector assembly including a diverter valve in each passage disposed in the path of travel of material gravitating therethrough and selectively movable between a number of alternate positions for determining the amount of material directed to said upper loading zone relative to said lower loading zone.

2. In a distribution machine as claimed in claim 1, each of said diverter valves being selectively movable to a first position closing the upper loading zone and opening the lower loading zone and a second position closing the lower loading zone and opening the upper loading zone.

3. In a distribution machine as claimed in claim 2, each of said diverter valves further being selectively movable to a third position opening both loading zones.

4. In a distribution machine as claimed in claim 1, further comprising mechanism operably coupled with the diverter valves of all said passages for moving all diverter valves simultaneously.

5. In a distribution machine as claimed in claim 4, said mechanism including an operating lever secured to each valve respectively, a push-pull rod, and a coupling operably connecting each lever respectively with the rod.

6. In a distribution machine as claimed in claim 1, said collector assembly having a floor closing the bottom thereof, said floor being selectively removable to permit gravity clean-out of the corresponding tank when the diverter valves are disposed in a position directing all material flow toward the lower loading zones.

7. In a distribution machine as claimed in claim 6, said floor having a horizontally extending series of generally concave, upwardly facing receptacles thereon defining said lower loading zones of the collector assembly.

8. In a distribution machine as claimed in claim 1, said collector assembly being comprised of at least a pair of vertically stacked collector modules presenting an upper collector module and a lower collector module, each collector module having a horizontal series of side-by-side compartments therein defined by horizontally spaced partitions in the module, each compartment in the upper collector module being in vertical registration with a corresponding compartment in the lower collector module to define one of said passages.

* * * * *